(12) United States Patent
Kapadia et al.

(10) Patent No.: US 9,998,684 B2
(45) Date of Patent: Jun. 12, 2018

(54) METHOD AND APPARATUS FOR VIRTUAL 3D MODEL GENERATION AND NAVIGATION USING OPPORTUNISTICALLY CAPTURED IMAGES

(71) Applicant: Indiana University Research and Technology Corp., Indianapolis, IN (US)

(72) Inventors: Apu Kapadia, Bloomington, IN (US); Md Zahidur Rahman, Bloomington (IN); David Crandall, Bloominton, IN (US); Robert E. Templeman, Bloomington, IN (US)

(73) Assignees: Indiana University Research and Technology Corporation, Indianapolis, IN (US); The United States of America as Represented by the Secretary of the Navy, Washington, DC (US)

( * ) Notice: Subject to any disclaimer, the term of this patent is extended or adjusted under 35 U.S.C. 154(b) by 167 days.

(21) Appl. No.: 14/460,914

(22) Filed: Aug. 15, 2014

(65) Prior Publication Data
US 2015/0049170 A1    Feb. 19, 2015

Related U.S. Application Data

(60) Provisional application No. 61/866,727, filed on Aug. 16, 2013.

(51) Int. Cl.
| | |
|---|---|
| *H04N 13/02* | (2006.01) |
| *H04N 13/04* | (2006.01) |
| *H04N 5/225* | (2006.01) |
| *G06T 13/00* | (2011.01) |
| *H04N 5/262* | (2006.01) |
| *G06T 17/00* | (2006.01) |
| *G06T 15/20* | (2011.01) |

(52) U.S. Cl.
CPC ........ *H04N 5/2621* (2013.01); *G06T 15/205* (2013.01); *G06T 17/00* (2013.01)

(58) Field of Classification Search
CPC ........................ G06T 2200/08; G06T 17/00
See application file for complete search history.

(56) References Cited

U.S. PATENT DOCUMENTS

| | | | |
|---|---|---|---|
| 6,556,196 B1 * | 4/2003 | Blanz | G06K 9/00275 345/419 |
| 7,027,054 B1 * | 4/2006 | Cheiky | H04N 5/262 345/473 |

(Continued)

OTHER PUBLICATIONS

Allen et al., "Dredging up the past: Lifelogging, Memory, and Surveillance", The University of Chicago Law Review, vol. 75, No. 1, Winter, 2008, pp. 47-74.

(Continued)

*Primary Examiner* — Rebecca Volentine
(74) *Attorney, Agent, or Firm* — Faegre Baker Daniels LLP (57) ABSTRACT

A method and device for opportunistically collecting images of a location via a mobile device, the device including algorithms that allow the selective winnowing of collected images to facilitate the creation of a 3D model from the images while minimizing the storage needed to hold the pictures.

19 Claims, 4 Drawing Sheets

(56) References Cited

U.S. PATENT DOCUMENTS

| | | | | |
|---|---|---|---|---|
| 8,587,583 | B2* | 11/2013 | Newcombe | G06T 17/00 345/420 |
| 2001/0031005 | A1* | 10/2001 | Nister | G06T 7/0071 375/240.16 |
| 2003/0066949 | A1* | 4/2003 | Mueller | G01B 11/00 250/208.1 |
| 2004/0189686 | A1* | 9/2004 | Tanguay, Jr. | G06Q 40/08 715/716 |
| 2006/0061583 | A1* | 3/2006 | Spooner | G06T 15/20 345/582 |
| 2007/0019081 | A1* | 1/2007 | Nakashima | H04N 1/2112 348/231.99 |
| 2010/0053370 | A1* | 3/2010 | Crisan | H04N 5/235 348/231.2 |
| 2011/0193994 | A1* | 8/2011 | Nozawa | H04N 5/772 348/231.3 |
| 2012/0155751 | A1* | 6/2012 | Aoba | G06T 7/00 382/159 |
| 2012/0169897 | A1* | 7/2012 | Karn | H04N 5/772 348/231.2 |
| 2012/0242844 | A1* | 9/2012 | Walker | G11B 27/034 348/207.1 |
| 2013/0195316 | A1* | 8/2013 | Bataller | G06K 9/00255 382/103 |
| 2013/0215239 | A1* | 8/2013 | Wang | G06T 7/0071 348/50 |
| 2013/0293686 | A1* | 11/2013 | Blow | G06T 7/55 348/50 |
| 2013/0335554 | A1* | 12/2013 | Brunner | G01C 21/16 348/135 |
| 2014/0368620 | A1* | 12/2014 | Li | H04N 13/0282 348/50 |

OTHER PUBLICATIONS

Templeman et al., "PlaceRaider: Virtual Theft in Physical Spaces with Smartphones", School of Informatics and Computing, Indiana University Bloomington,Proceedings of the 20th Annual Network and Distributed System Security Symposium (NDSS), Feb. 2013.
Roesner et al., User-Driven Access Control: Rethinking Permission Granting in modern Operating Systems, MSR-TR-2011-91, IEEE Symposium on Security and Privacy, 2012, pp. 224-238.
Xiao et al., "SUN Database: Large-scale Scene Recognition from Abbey to Zoo", Massachusetts Institute of Technology, Brown University, IEEE Conference on Computer Vision and Pattern Recognition (CVPR), 2010, pp. 3485-3492.
Li et al., "Landmark Classification in Large-scale Image Collections", Department of Computer Science, Cornell University, IEEE International Conference on Computer Vision, 2009.
Lowe, "Distinctive Image Features from Scale-Invariant Keypoints", Computer Science Department, University of British Columbia, International Journal of Computer Vision, vol. 60, No. 2, pp. 91-110, Nov. 2004.
Korayem et al., "Solving Avatar Captchas Automatically", School of Informatics and Computing, Indiana University, Advanced Machine Learning Technologies and Applications, Springer 2012, pp. 102-110.
Oliva, "Modeling the Shape of the Scene: A Holistic Representation of the Spatial Envelope", International Journal of Computer Vision 42(3), 2001, pp. 145-175.
Douze et al., "Evaluation of GIST descriptors for web-scale image search", CIVR 09, Jul. 8-10, 2009, Santorini, GR.
Dalal et al., "Histograms of Oriented Gradients for Human Detection", INRIA Thone-Alps, France, IEEE Conference on Computer Vision and Pattern Recognition, 2005, pp. 886-893.
Fan et al., "LIBLINEAR: a Library for Large Linear Classification", Journal of Machine Learning Research 9 (2008) pp. 1871-1874.
Gionis et al., "Similarity Search in High Dimensions via Hashing", Department of Computer Science, Stanford University, Proceedings of the 25th VLDB Conference, Edinburgh, Scotland, 1999.

Arya et al., "Chapter 30—Approximate Nearest Neighbor Queries in Fixed Dimensions" ACM Symposium on Discrete Algorithms, 1993, pp. 271-280.
Wu, "SiftGPU Manual", University of North Carolina at Chapel Hill, http://cs.unc.edu/~ccwu/siftgpu, Oct. 22, 2011.
Hsu et al., Homomorphic Encryption-based Secure SIFT for Privacy-Preserving Feature Extraction, SPIE-IS&T, vol. 7880, copyright 2011.
Lazebnik et al., "Beyond gas of features: spatial pyramid matching for recognizing natural scene categories", IEEE Computer Society, Jun. 2006, pp. 2169-2178.
Duan et al., "A Multi-layer Composite Model for Human Pose Estimation", British Machine Vision Conference, 2012.
Cheng et al., "Total Recall: Are Privacy Changes Inevitable?", CARPE 04, Oct. 15, 2004.
Kärkkäinen et al., "I Don't Mind Being Logged, but Want to Remain in Control: A Field Study of Mobile Activity and Context Logging", CHI 2010: Privacy Awareness and Attitudes Apr. 10-15, 2010, Atlanta, GA, USA.
Chaudhari et al., "Privacy Protection for Life-log Video", IEEE Workshop on Signal Processing Applications for Public Security and Forensics, 2007, pp. 1-5.
Bugiel, et al. "XmanDroid: A New Android Evolution to Mitigate Privilege Escalation Attacks", Technical Report TR-2011-04, Apr. 30, 2011.
Enck et al., "Mitigating Android Software Misuse Before It Happens", Technical Report NAS-TR-0094-2008, Pennsylvania State University, Sep. 22, 2008.
Dietz et al., "Quire: Lightweight Provenance for Smart Phone Operating Systems", CoRR, vol. abs/1102.2445, 2011.
Felt et al., "Permission Re-Delegation: Attacks and Defenses", Proceedings of he USENIX Conference on Security, 2011, pp. 22-22.
Bugiel et al., "Towards Taming Privilege-Escalation Attacks on Android", CASED Technische Universitat Darmstadt, Germany, 19th Annual Network & Distributed System Security Symposium NDSS), Feb. 2012.
Nauman et al., "Apex: Extending Android Permission Model and Enforcement with User-defined Runtime Constrains", ASIACCS'10 Apr. 13-16, 2010, Beijing, China.
Ongtang et al., "Porscha: Policy Oriented Secure Content Handling in Android", ACSAC' 2010, Dec. 6-10, 2010, Austin, Texas USA.
Conti et al., "CrePE: Context-Related Policy Enforcement for Android", University of Amsterdam, International Conference on Information Security, 2011, pp. 331-345.
Enck et al., "TaintDroid: An Information-Flow Tracking system for Realtime Privacy Monitoring on Smartphones", USENIX Conference on Operating Systems Design and Implementation, 2010, pp. 1-6.
Portokalidis et al., "Paranoid Android: Versatile Protection for Smartphones", University of Amsterdam, ACSAC' 2010, Dec. 6-10, 2010, Austin, Texas USA.
Truong et al., "Preventing Camera Recording by Designing a Capture-Resistant Environment", College of Computing and GVU Center, Georgia Institute of Technology, International Conference on Ubiquitous Computing, 2005, pp. 73-886.
Jana et al., "A Scanner Darkley: Protecting User Privacy From Perceptual Applications", 2013 IEEE Symposium on Security and Privacy.
Se et al., "Local and Global Localization for Mobile Robots using Visual Landmarks", Department of Computer Science, University of British Columbia, IEEE International Conference on Intelligent Robots and Systems, 2001, pp. 414-420.
Se et al., "Global Localization using Distinctive Visual Features", Proceedings of the 2002 IEEE/RSJ Intl. Conference on Intelligent Robots and Systems, EPFL, Lausanne, Switzerland, Oct. 2002.
Se et al., Mobile Robot Localization and Mapping with Uncertainty using Scale-Invariant Visual Landmarks, The International Journal of Robotics Research, vol. 21, No. 8, Aug. 2002, pp. 735-758.
Se et al., "Vision-Based Global Localization and Mapping for Mobile Robots", IEEE Transactions on Robotics, vol. 21, No. 3, Jun. 2005.

(56) References Cited

OTHER PUBLICATIONS

Ulrich et al., "Appearance Based Place Recognition for Topological Localization", IEEE International Conference on Robotics and Automation, San Francisco, California, Apr. 2000, pp. 1023-1029.
Ledwich et al., "Reduced SIFT Features for Image Retrieval and Indoor Localization" ARC Centre of Excellence for Autonomous Systems, School of Aerospace Mechanical and Mechatronic Engineering, Australian Conference on Robotics and Automation, 2004.
Snavely et al., "Modeling the World from Internet Photo Collections", International Journal of Computer Vision, vol. 80, pp. 189-210, 2008.
News & Notes, CompSci@Carolina, Fall 2010, Issue 46, University of North Carolina.
Li et al., "Modeling and Recognition of Landmark Image Collections Using Iconic Scene Graphs", Dept. of Computer Science, University of North Carolina, European Conference on Computer Vision, 2008, pp. 427-440.
Quattoni et al., "Recognizing Indoor Scenes", CSAIL, MIT, IEEE Conference on Computer Vision and Pattern Recognition, 2009.
Hightower et al., "A Survey and Taxonomy of Location Systems for Ubiquitous Computing", University of Washington, Computer Science and Engineering, Technical Report UW-CSE 01-08-03, Aug. 24.
Savvides et al., "Dynamic Fine-Grained Localization in Ad-Hoc Networks of Sensors", Department of Electrical Engineering, University of California, LA, Technical Report TM-UCLA-NESL-2001-01-001. Accepted for Publication to Mobicom 2001.
Kourogi et al., "Personal Positioning based on Walking Locomotion Analysis with Self-Contained Sensors and a Wearable Camera", National Institute of Advanced Industrial Science and Technology, Proceedings of the Second IEEE and ACM International Symposium on Mixed and Augmented Reality (ISMAR '03), copyright 2003.
Woodman et al., "Pedestrian Localization for Indoor Environments" ACM, 2008, UbiComp '08, Sep. 21-24, 2008, Seoul, Korea.
Backes et al., "Tempest in a Teapot: Compromising Reflections Revisited", Saarland University, $30^{th}$ IEEE Symposium on Security and Privacy, pp. 315-327, May 2009.
Backes et al., "Compromising Reflections or How to Read LCD Monitors Around the Corner", Saarland University, IEEE Symposium on Security and Privacy, pp. 158-169, May 2008.
Black et al., "A Framework for the Robust Estimation of Optical Flow", Department of Computer Science, University of Toronto, IEEE International Conference on Computer Vision, pp. 231-236, 1993.
Cai et al., "Defending Against Sensor-Sniffing Attacks on Mobile Phones", MobiHeld '09, Aug. 17, 2009, Barcelona, Spain.
Crandall et al., "Discrete-Continous Optimization for Large-Scale Structure from Motion", IEEE Conference on Computer Vision and Pattern Recognition, 2011.

Felt et al., "The Effectiveness of Application Permissions" University of California, Berkeley, USENIX Conference on Web Application Development, 2011.
Furukawa et al., "Reconstructing Building Interiors from Images", University of Washington, 2009 IEEE $12^{th}$ International Conference on Computer Vision (ICCV).
Furukawa et al., "Accurate, Dense, and Robust Multi-View Stereopsis", IEEE Transactions on Pattern Analysis and Machine Intelligence, 32(8): 1362-1376, Aug. 2010.
Gabarda et al., "Blind image quality assessment through anisotropy", J. Opt. Soc. Am. A/vol. 24, No. 12, Dec. 2007.
Kuhn, "Optical Time-Domain Eavesdropping Risks of CRT Displays", University of Cambridge, Computer Laboratory, Proceedings 2002 IEEE Symposium on Security and Privacy.
Laxton et al., "Reconsidering Physical Key Secrecy: Teleduplication via Optical Decoding", CCS '08, Oct. 27-31, 2008 Alexandria, Virginia.
Liu et al., "VirusMeter: Preventing Your Cellphone from Spies", RAID 2009, LNCS 5758, pp. 244-.
Lowe, "Distinctive Image Features from Scale-Invariant Keypoints", International Journal of Computer Vision 60(2), pp. 91-110, 2004.
Marquardt et al., "(sp)iPhone: Decoding Vibrations From Nearby Keyboards Using Mobile Phone Accelerometers", CCS'11, Oct. 17-21, 2011, Chicago, Illinois.
Miluzzo et al., "TapPrints: Your Finger Taps Have Fingerprints", AT Labs—Research, MobiSys'12, Jun. 25-29, 2012, Low Wood Bay, Lake District, United Kingdom.
Mowery et al., "Heat of the Moment: Characterizing the Efficacy of Thermal Camera-Based Attacks", USENIX Conference on Offensive Technologies, WOOT' 22, p. 6, 2011.
Ongtang et al., "Semantically rich applications-centric security in Android", 2009 Annual Computer Security Applications Conference, ACSAC '09, pp. 340-349, 2009.
Owusu et al., "ACCessory: Password Inference using Accelerometers on Smartphones", HotMobile' 12, Feb. 28-29, 2012, San Diego, California.
Raguram et al., "iSpy: Automatic Reconstruction of Typed Input from Compromising Reflections", CCS' 11, Oct. 17-21, 2011, Chicago, Illinois.
Schlegel et al., "Soundcomber: a Stealthy and Context-Aware Sound Trojan for Smartphones", Proceedings of the $128^{th}$ Annual Network and Distributed System Security Symposium, NDSS' 11, 2011.
Snavely et al., "Photo Tourism: Exploring Photo Collections in 3D", SIGGRAPH Conference Proceedings, pp. 835-846, 2006.
Xu et al., "Stealthy Video Capturer: A New Video-based Spyware in 3G Smartphones", WiSec' 09, Mar. 16-18, 2009, Zurich, Switzerland.
Zhou et al., "Dissecting Android Malware: Characterization and Evolution", 2012 IEEE Symposium on Security and Privacy.

\* cited by examiner

METHOD AND APPARATUS FOR VIRTUAL 3D MODEL GENERATION AND NAVIGATION USING OPPORTUNISTICALLY CAPTURED IMAGES

PRIORITY

The present disclosure is a non-provisional application of U.S. application Ser. No. 61/866,727, titled METHOD AND APPARATUS FOR VIRTUAL 3D MODEL GENERATION AND NAVIGATION USING OPPORTUNISTICALLY CAPTURED IMAGES, filed Aug. 16, 2013. The present application incorporates the disclosure thereof and claims priority thereto.

GOVERNMENT INTEREST

This invention was made with government support under 1016603 awarded by the National Science Foundation. The Government has certain rights in the invention.

FIELD OF THE DISCLOSURE

The present disclosure is related to methods and devices to support the creation of virtual 3D model and for the searching of items located within the modeled area. The present disclosure is related more specifically to methods and devices for creating 3D models and recording of items within the modeled area through the use of passive data capture by a mobile device such as a smartphone.

BACKGROUND AND SUMMARY

Handheld computing devices, such as smart phones, possess increasing computing power. Such devices further include multiple sensors that can be used to capture data about the environment in which they are located. Indeed, many such devices have the ability to collect more data than they have the ability to store locally. Such captured data can be put to multiple uses.

However, the conscious capturing of data has the potential to be time consuming for a user. Furthermore, the conscious capturing of such data has the potential to impact what data is captured and what data is missed. Accordingly, there exists a need for facilitating such data capture in a way that at least partially removes user bias in capturing events, such as by capturing images automatically and in the background while the user operates the mobile device to perform other functions (i.e., opportunistic image capturing). There also exists a need for efficiently and autonomously identifying useful data from large amounts of data collected autonomously by a mobile device to avoid overloading the local storage capacity and/or external data transmission ability of the device.

According to one embodiment of the present disclosure, a method of assembling a data set for the creation of a 3D model of a space is provided. The method includes obtaining a plurality of images that have been passively captured by a mobile device; storing the plurality of images on the mobile device in mobile device storage; automatically electronically analyzing the stored images by the mobile device to assess at least one of quality, content, and redundancy; and automatically deleting one or more images from the mobile device storage responsive to the automatic electronic analysis to create a retained subset of the obtained plurality of images.

According to another embodiment of the present disclosure, a mobile device is provided including: a camera, a memory; and an image analyzer, the image analyzer operable to execute code. The code causes the image analyzer to: obtain a plurality of images captured by the camera and stored in the memory; automatically electronically analyze the stored images to assess at least one of quality, content, and redundancy; and automatically delete one or more images from the mobile device storage responsive to the automatic electronic analysis to create a retained subset of the obtained plurality of images.

According to yet another embodiment of the present disclosure, a non-transitory computer readable medium is provided having instructions thereon that when interpreted by a processor cause the processor to: obtain a plurality of images captured by a camera of a mobile device and stored in a memory of the mobile device; automatically electronically analyze the stored images to assess at least one of quality, content, and redundancy; and automatically delete one or more images from the mobile device storage responsive to the automatic electronic analysis to create a retained subset of the obtained plurality of images.

BRIEF DESCRIPTION OF THE DRAWINGS

The above-mentioned aspects of the present teachings and the manner of obtaining them will become more apparent and the teachings will be better understood by reference to the following description of the embodiments taken in conjunction with the accompanying drawings, wherein.

DETAILED DESCRIPTION OF EMBODIMENTS

The embodiments disclosed herein are not intended to be exhaustive or limit the invention to the precise form disclosed in the following detailed description. Rather, the embodiments were chosen and described so that others skilled in the art may utilize their teachings.

Figures 1, 2:
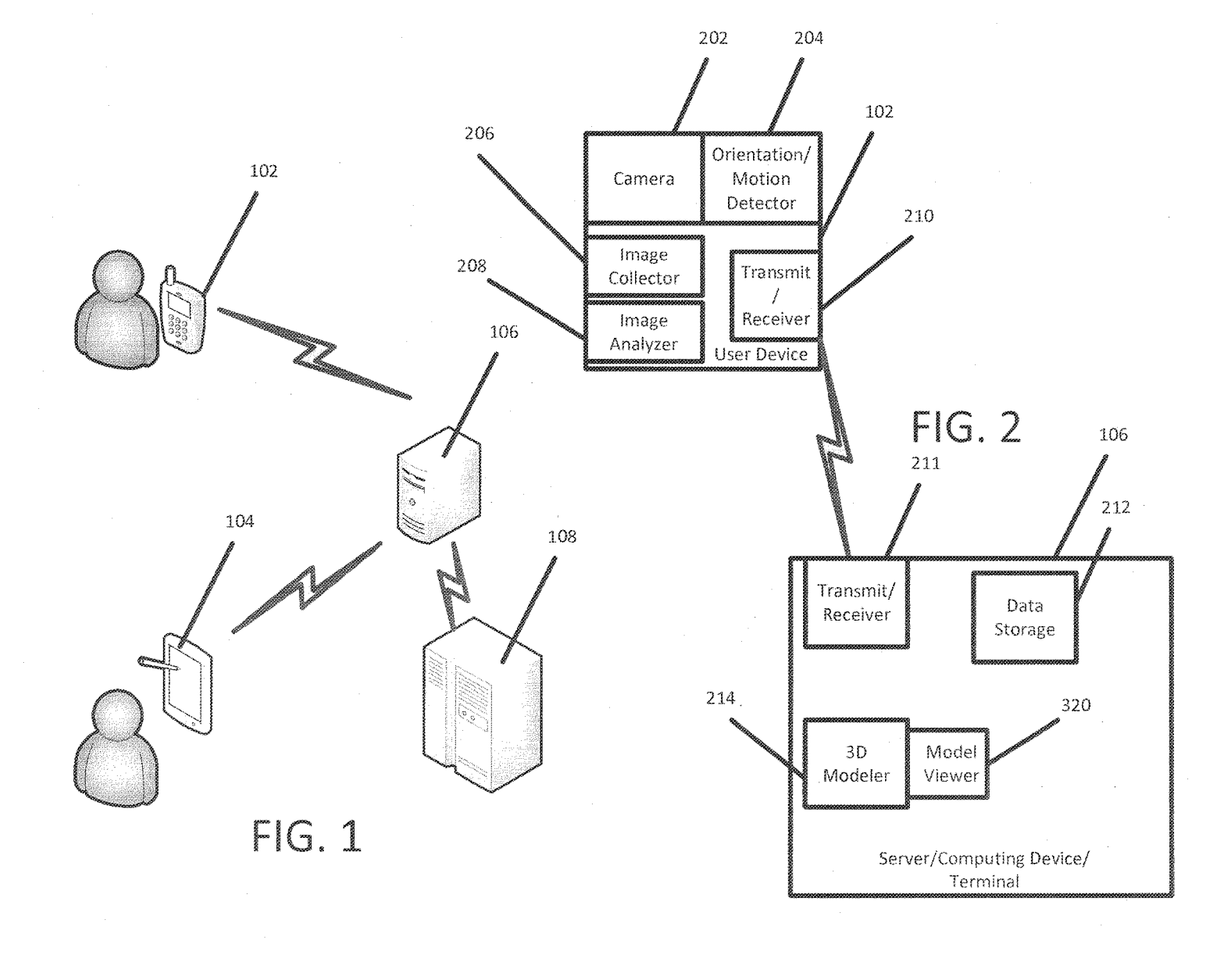
FIG. 1 is a diagram showing exemplary architecture of a system for remote data capture, storage, and processing.
FIG. 2 is a diagram showing internal components of portions of the system of FIG. 1.

FIG. 1 shows an exemplary architecture embodiment that includes mobile devices 102, 104, terminal 106, and data storage 108. FIG. 2 shows mobile device 102 and terminal 106 in increased detail according to one embodiment of the present disclosure.

In one embodiment, mobile device 102 is a smartphone and includes camera 202, orientation/motion detector 204, image collector 206, image analyzer 208, and transmitter/receiver 210. Camera 202 is a standard smartphone camera. Orientation/motion detector 204 is illustratively an arrangement of accelerometers, magnetometers, and gyroscopes embedded within mobile device 102. Image collector 206 and image analyzer 208 are illustratively a processor executing code. Transmitter/receiver 210 is illustratively a wireless data port that provides for transmitting data from mobile device 102.

Terminal 106 is illustratively a standard desktop computer that has access to data storage 108. However, it should be appreciated that terminal 106 can represent any computing device. Indeed, in certain embodiments, the parts and functionality described as part of terminal 106 can be integrated into mobile device 102 or another mobile device. Terminal 106 includes transmitter/receiver 211, data storage 212, and 3D modeler 214. Transmitter/receiver 211 is illustratively a wired or wireless data port that provides for receiving data from mobile device 102. Data storage 212 is illustratively a local hard drive but also represents storage provided by data storage 108. 3D Modeler 214 is illustratively a processor executing code.

The above system is operable to collect a plurality of images via mobile device 102. These images are then later used to construct a 3D model of the environment in which mobile device 102 is/was located. Such a system has multiple uses. Such uses include but are not limited to creation of a video log (life log), establishing an inventory of a location (for insurance recovery in the event of loss or otherwise), and establishing a model of a premises for interior design modeling purposes.

In operation, mobile device 102 is provided with an image acquisition and analysis application. The application has access to camera 202 and motion detector 208. The application includes image collector 206 that collects sensor data including images and acceleration and orientation readings associated with each image. These services can run in the background, independent of applications and with minimal or no user interface. Accordingly, such data acquisition can run without the user being conscious of such operation. The user need not actively participate in the collection of data. Instead, the user can simply use mobile device 102 in a conventional manner (i.e., to communicate, access the internet, etc.) while in the environment to be modeled.

Figure 3:
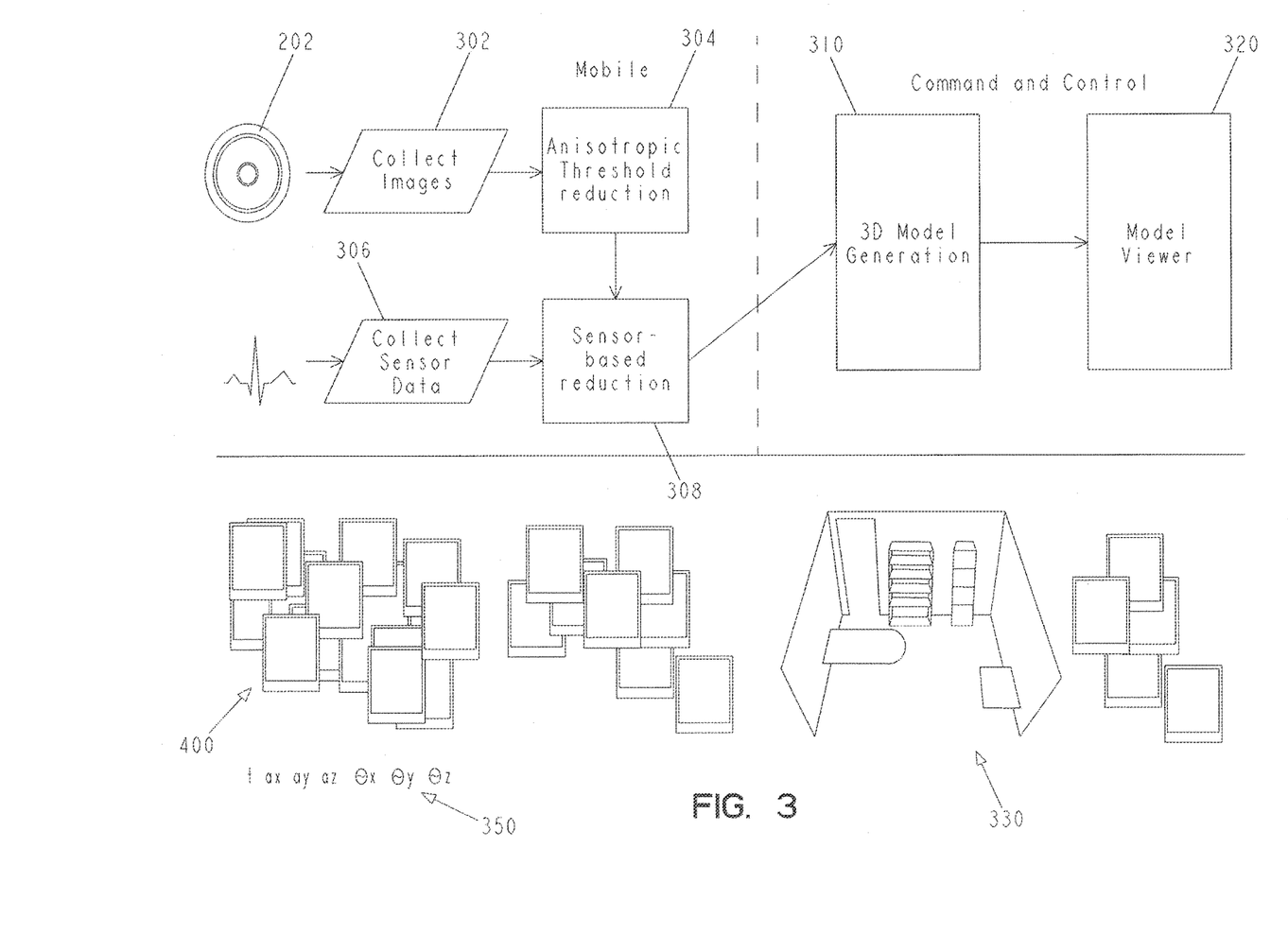
FIG. 3 is a diagram showing data collection and processing according to an embodiment of the present disclosure.

Accordingly, once the application is running, images are captured along with acceleration and orientation data 350 (FIG. 3). The raw data is reduced and formatted before being transmitted to terminal 106 (also referred to as the command and control platform). Once obtained at terminal 106, 3D models are generated such that an individual can explore and examine the model and associated images to ascertain the contents and features of the captured area(s). Such events are discussed in more detail below.

As depicted in FIG. 3, image collector 206 (via camera 202) captures images 400 at block 302. In the present exemplary embodiment, images are captured every two seconds. In one embodiment, the frequency of image capture is modified based upon inputs from motion detector 204. In order to cause as little disruption to the user as possible, any shutter sounds that are associated with image acquisition may be eliminated and/or greatly reduced. Additionally, any camera functionality that provides the user with a "preview" of a taken photograph may be eliminated such that the screen of the smartphone is not disrupted by the background operation of image acquisition. Accordingly, images are obtained in a manner that is undetectable by a user of the mobile device.

Captured images are then analyzed by image analyzer 208. Because the images are opportunistically taken and the camera is not specifically aimed at any particular subject, many images may be either of very low quality (e.g. completely dark photos while mobile device 102 is resting on a desk, or very blurry images when mobile device 102 is moving rapidly) or to be redundant (e.g. many duplicated pictures of exactly the same static scene). Such images are not very useful, and thus lightweight heuristics 304 (data reduction operations) are applied on mobile device 102 in order to identify and discard these uninformative images. The objective is to find a minimal subset of images that both preserves sufficient fidelity of the subsequently generated model and provides the ability to ascertain valuable information such that virtual space can be re-created and items can be recognized. This data reduction conserves mobile device 102 storage space and network bandwidth, and reduces the computational requirements for constructing 3D models.

Figure 4:
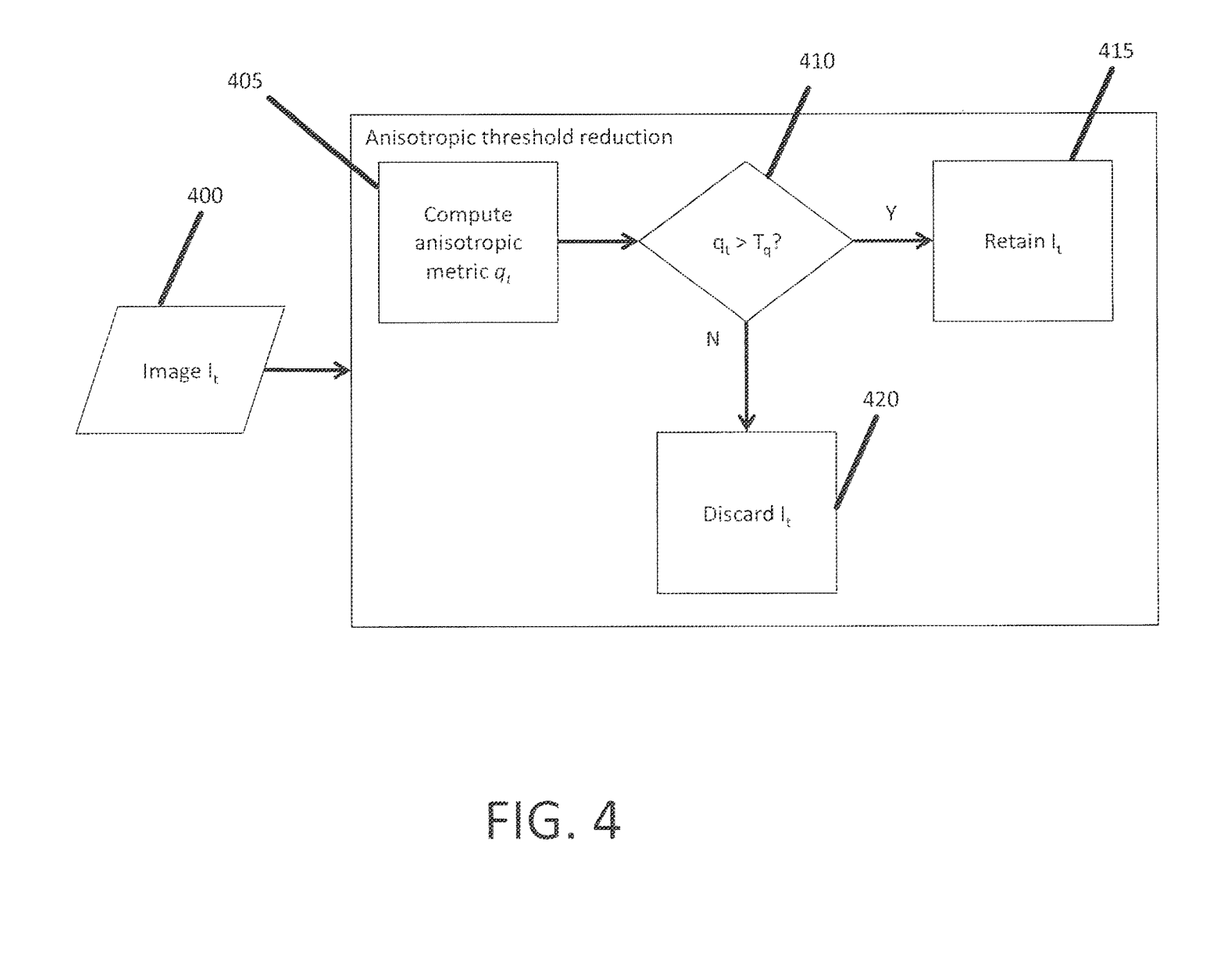
FIG. 4 is a flowchart showing data efficiency operations performed in accordance with an embodiment of the present disclosure.

Referring now to FIG. 4, to filter out blurry and poorly exposed images 400 that are unlikely to be useful, a lightweight quality measure for a single image is provided. An algorithm is provided to calculate a measure of an image's anisotropy, block 405, which is the variance of the entropy of pixels as a function of the directionality. This anisotropy-based quality method allows the application to estimate the quality of captured images and discard images having a quality score less than some threshold value Tq, block 410 and retain images 500 having a quality score greater than the threshold value Tq, block 415. Alternatives to anisotropic metrics may be employed to blindly infer image quality as will be appreciated by those skilled in the art.

Figure 5:
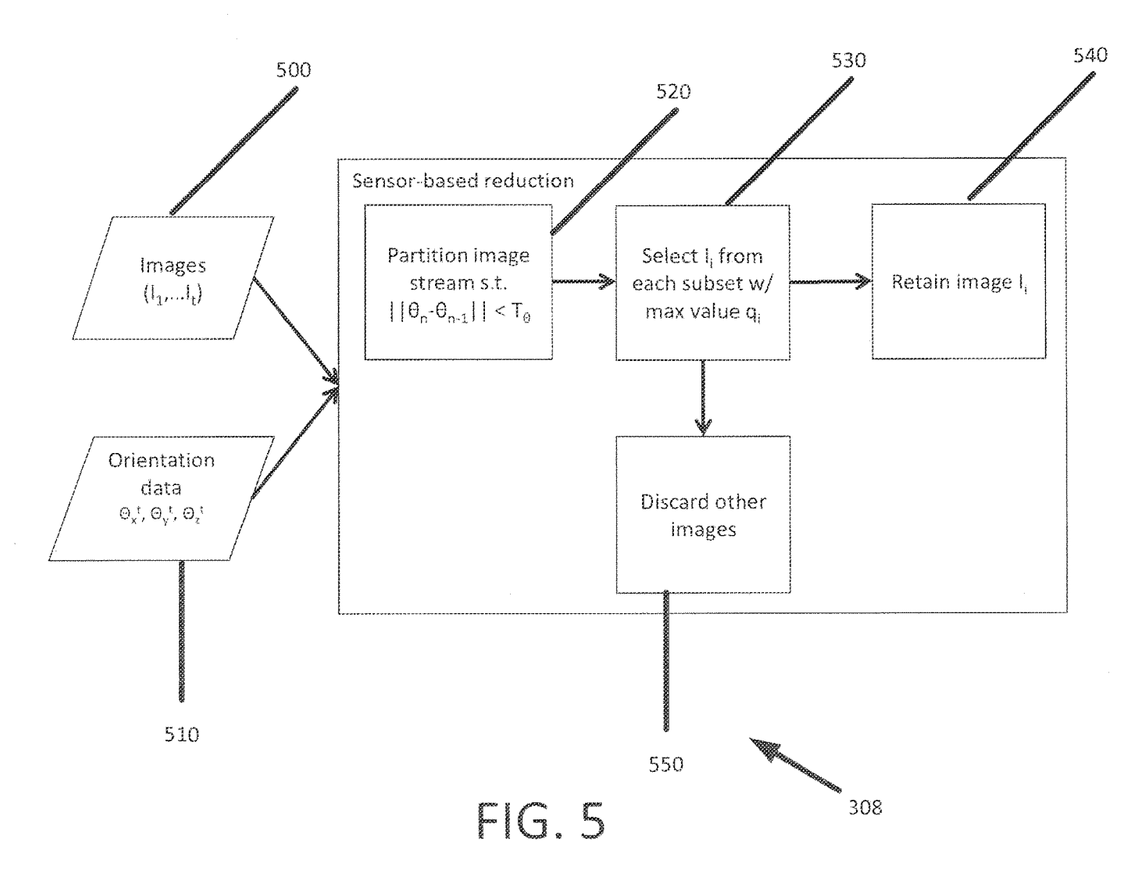
FIG. 5 is a flowchart showing additional data efficiency operations performed in accordance with an embodiment of the present disclosure.

After removing low-quality images based on the quality threshold, block 420, the image set is further reduced by removing groups of successive images that are nearly identical, a process represented by block 308 of FIG. 3, which is expanded in FIG. 5. These groups of redundant images are typically quite common because in normal mobile device 102 usage there are periods in which there is little physical movement of mobile device 102.

The orientation sensors 204 of mobile device 102 are used to detect times during which mobile device 102 is at rest or moving very little. Orientation sensors 204 provide a time series of absolute 3D orientation vectors (specifying camera viewing direction parameterized by vectors on the unit sphere) (block 510).

For example, let $\Theta t = (\Theta z^t, \Theta y^t, \Theta x^t)$ denote the orientation vector at time t. Taking finite differences, one can then approximate the angular velocity at time t as: $\Delta \Theta t = //\Theta t+1 - \Theta t//$.

Each image i 500 taken by camera 202 is associated with a time-stamp value $t_i$ that represents the image capture time logged by the system. Images are partitioned (ordered by timestamp) into groups of consecutive photos, block 520, such that all images in the group have corresponding values of $\Delta \Theta t$ less than a threshold $T_\Theta$. Then only the highest quality image (according to the anisotropy metric) is kept from each of these partitions (blocks 530, 540, 550).

In some instances, the architecture of mobile devices 102, such as Android devices, introduces a lag between the hardware capture timestamp and the image timestamp due to the time required by the system to create the JPEG image. This means that sensor timestamps and image timestamps are misaligned by some unknown offset. In one embodiment the lag was estimated to be nondeterministic but approximately normally distributed with a mean of 450 ms and standard deviation of 50 ms. To estimate the sensor data associated with an image, the mean of all the sensor samples is taken which are within one standard deviation away from the mean of the actual sensor timestamp ($t_i' = t_i - 450$). This amount of lag will likely vary from mobile device 102 to mobile device 102 depending on hardware and operating system versions. In one embodiment, the application calibrates itself by estimating mobile device 102 motion using an optical flow algorithm and compares this to sensor data, estimating the lag from a few minutes of data. The effectiveness of this two-step reduction process depends on suitable values of $T_q$ and $T_\Theta$. In this manner, the amount of storage necessary on mobile device 102 is reduced.

This culled and reduced image set is then transmitted via transmitter/receiver 210 such that the images are provided to transmitter/receiver 211 of terminal 106 and stored in data storage 212 (or 108).

"Structure from motion" (SfM) is an area of computer vision that generates a 3D model of a scene from a set of images taken from a moving camera. One implementation of SfM works on unstructured collections of images in which the pose parameters of the cameras are not known. This approach finds points in images that are highly distinctive, so that 2D image points corresponding to the same 3D point in the original scene can be identified across different images. These (noisy) point correspondences induce constraints on the 3D structure of the scene points and the position and orientation of the camera that took each image. Performing 3D reconstruction thus involves solving a very large non-linear optimization problem to find camera poses and scene configurations that satisfy the constraints to the greatest degree possible.

In one embodiment, 3D modeler 214 (FIG. 2) is commercially available software called Bundler, which was developed by Noah Snavely of Cornell University and is distributed under the GNU General Public License. The Bundler toolkit is used to generate sparse 3D point clouds from provided images as represented by block 310 of FIG. 3. SfM produces a relatively sparse reconstruction consisting of just the most distinctive scene points. To create a denser reconstruction, SfM analysis is followed with a multiview stereo algorithm, the Patchbased Multiview Stereo (PMVS) software of Y. Furukawa and J. Ponce; *Accurate, dense, and robust multiview stereopsis.* IEEE Transactions on Pattern Analysis and Machine Intelligence, 32(8): 1362{1376, August 2010.

In certain embodiments, some changes may be made to these tools to facilitate workflow and analysis, but in other embodiments the core algorithms and parameters may be left unchanged. The workflow just described generates a model 330 (a 'point cloud') that is comprised of a collection of points, or vertices, each described with a three-dimensional location and color, and stored in the Stanford Polygon3 (PLY) format. This format is understood by a variety of existing viewers 320, including MeshLab4.

Exploration of even moderate-quality models generated with this approach yields reliable identification of gross features including walls, doors, windows, ceilings, pieces of furniture, and some smaller items. Higher-quality models that are built from commensurately high-quality images make it possible to read text on documents and identify small objects including keys and mobile devices.

To explore the models more powerfully and facilitate the extraction of information, the present disclosure provides a tool that allows users to select regions in a 3D model and then view the raw images from that region of interest in the model. To do this, a MeshLab plugin was developed that captures the selected vertices and then invokes a modified version of the open source image viewer JExifViewer. The modified viewer uses the PMVS patch file to extract the reference images associated with each of the selected vertices. These images are presented to the user in the order of coverage, showing the image that contains the greatest fraction of selected vertices first. This allows the viewing user to easily identify images that have the greatest impact on the region of interest in the model. JExifViewer allows for convenient viewing of images with rotation and zooming capability to provide the user with a powerful interface for the presented images.

Regarding the Meshlab plugin discussed above, this disclosure now provides specifics on how such plugin works and how it is experienced by a user. First, a user selects a rectangular region of the current point cloud model (.PLY file) using the MeshLab tool. The default action for the associated selection plugin is to construct a XOR box with the selected rectangle as the front face of the box. A new plugin was created using the MeshEditInterface of the VCG library that overrides this default action of selection edit plugin to add the functionality to get the coordinates of points in the box and write them into a temporary data structure called SelectedVertices.

A user then clicks on the plugin shortcut in the edit menu or invokes a keyboard shortcut (Ctrl+G) to fetch images that were used to reconstruct the selected region as follows:

The custom plugin works as follows:
 a. Read the current SelectedVertices data structure,
 b. Dump the list of coordinates of SelectedVertices into a temporary file,
 c. Call the external viewer's executable jar from within C using JNI with the following parameters:
  i. Environmental path for the current model:
   a. Patch file that contains information about the images used to construct each of the points in the point cloud model.
   b. Directory path containing the images used to construct the model.
  ii. Path of the temp file containing the selectedVertices coordinates.

A separate execution thread is used to execute the external viewer every time it is invoked on a model. As a result a user can watch multiple viewers at the same time.

The model data structures can be large and novel optimizations are necessary to ensure usability. When the External Viewer is invoked on a model, it performs the following optimizations:
 a. Preloading Optimization by reading/parsing the huge patch file into a memory mapped searchable object called PatchMap(M) only for the first time the viewer is invoked on a model M. A patch file contains information about the raw images contributing to the reconstruction of each point in the point cloud model. This optimization step involves:
  i. If memory mapped objects do not exist for the current model then,
   1. Read and Parse the patch file using a memory efficient parsing algorithm to construct a searchable data structure PatchMap(M) that maps a point p(x, y, z) in the model M to a list of contributing images called DonorList(M).
   2. Write PatchMap into a memory mapped object in persistent memory.
  ii. Otherwise, skip the time consuming reading/parsing of patches by preloading the memory mapped object as a searchable PatchMap(M).
 b. Parsing Optimization by using a memory efficient parsing algorithm as follows:
  i. Read a chunk of the huge patch file at a time. The size of the chunk is estimated from the maximum memory allowed to the process and a desired speed of control. Both parameters are dynamically configurable using a config file.

ii. Parse the chunk into a ChunkMap. It contains for each point a DonorList of raw images that contribute toward reconstructing the point in the model.

timer, which led to further variation in the size of image sets (ranging from 115 to 1,520 images, with a mean of 864). For 4 of 20 test sets, sensor data was missing due to technical problems with the application.

The first column of Table 1 summarizes the data collected by the study.

| TID | pre-PMVS image set | | | PMVS image set | | | model vertices | | | model quality score | | |
|---|---|---|---|---|---|---|---|---|---|---|---|---|
| n | $X_n$ | $X_n^l$ | change | $X_n$ | $X_n^l$ | change | $X_n$ | $X_n^l$ | change | $X_n$ | $X_n^l$ | change |
| 1 | 1365 | 244 | −82.1% | 187 | 46 | −75.4% | 142k | 17k | −88.1% | 2 | 0 | −2 |
| 2 | 1305 | 243 | −81.4% | 195 | 69 | −64.6% | 99k | 51k | −48.2% | 4 | 10 | 6 |
| 3 | 1214 | 432 | −64.4% | 773 | 362 | −53.2% | 813k | 607k | −25.3% | 19 | 19 | 0 |
| 4 | 778 | 126 | −83.8% | 21 | 14 | −33.3% | 33k | 26k | −21.5% | 3 | 4 | 1 |
| 5 | 449 | 39 | −91.3% | 207 | 4 | −98.1% | 192k | 0k | −100.0% | 3 | 0 | −3 |
| *6 | 162 | 83 | −48.8% | 82 | 70 | −14.6% | 60k | 48k | −19.3% | 3 | 1 | −2 |
| 7 | 974 | 490 | −49.7% | 370 | 198 | −46.5% | 393k | 271k | −31.1% | 10 | 8 | −2 |
| *8 | 446 | 254 | −43.0% | 63 | 61 | −3.2% | 57k | 71k | 24.2% | 4 | 6 | 2 |
| 9 | 719 | 124 | −82.8% | 289 | 61 | −78.9% | 206k | 142k | −30.9% | 11 | 15 | 4 |
| 10 | 541 | 92 | −83.0% | 87 | 21 | −75.9% | 56k | 32k | −42.9% | 5 | 5 | 0 |
| 11 | 1520 | 353 | −76.8% | 790 | 251 | −68.2% | 796k | 546k | −31.4% | 20 | 20 | 0 |
| 12 | 1378 | 157 | −88.6% | 99 | 5 | −94.9% | 83k | 2k | −97.2% | 4 | 0 | −4 |
| *13 | 1445 | 729 | −49.6% | 444 | 353 | −20.5% | 354k | 399k | 12.8% | 19 | 18 | −1 |
| 14 | 1059 | 150 | −85.8% | 2 | 2 | 0.0% | 0k | 0k | 0.0% | 0 | 0 | 0 |
| *15 | 846 | 558 | −34.0% | 162 | 160 | −1.2% | 86k | 99k | 15.4% | 4 | 6 | 2 |
| 16 | 446 | 62 | −86.1% | 58 | 7 | −87.9% | 11k | 21k | 86.3% | 0 | 3 | 3 |
| 17 | 414 | 42 | −89.9% | 47 | 11 | −76.6% | 7k | 0k | −100.0% | 0 | 0 | 0 |
| 18 | 762 | 162 | −78.7% | 36 | 49 | 36.1% | 21k | 68k | 217.1% | 0 | 1 | 1 |
| 19 | 115 | 17 | −85.2% | 7 | 2 | −71.4% | 1k | 0k | −100.0% | 0 | 0 | 0 |
| 20 | 1343 | 293 | −78.2% | 229 | 86 | −62.4% | 209k | 145k | −30.6% | 13 | 11 | −2 |
| μ | 864.05 | 232.50 | −73.2% | 207.40 | 91.60 | −49.5% | 181k | 127k | −20.5% | 6.20 | 6.35 | 0.15 |
| σ | 447.28 | 193.22 | 17.9% | 230.43 | 113.68 | 37.5% | 240k | 184k | 73.9% | 6.74 | 6.93 | 2.43 | iii. Add the ChunkMap into the PatchMap(M).
iv. Continue steps (i-iii) until the end of file is reached.

The External Viewer shows an ordered list (CandidateList) of images in order of contribution toward reconstructing the selected region as follows:
a. Read the selectedVertices from the temp file.
b. For each point p(x, y, z) in the selectedVertices search the PatchMap(M) to get the DonorList for point p
c. For each image Im in the DonorList
   i. If CandidateList does not contain image Im then add Im into the CandidateList with contribution=1.
   ii. Else if CandidateList contains image Im then increment its contribution by
      1. The CandidateList is sorted in order of the contribution.
d. Present the images in the CandidateList in the sorted order of contribution.

A number of tests were performed using the system of the present disclosure. The application was installed on a phone and configured to take a photograph every two seconds. The camera was set with shutter priority so as to minimize motion blur and the resolution was set to 1 megapixel. The study consisted of 20 separate data collection events in the same office environment, using 20 participants recruited from a university campus. The test protocol led the participants through a series of activities designed to be representative of typical smartphone use, including Internet browsing, talking on the phone, and using basic applications.

Participants were unaware of the nature of the study or the details of what data were being collected. The application disabled the camera preview and shutter sound so that the user was not aware of the sensory collection effort. As the study was self-paced, collection time varied by participant. Moreover, the application occasionally stopped taking photos and sensor measurements and restarted using a watchdog In Table 1, ($X_n$) represents the raw image sets and ($X'_n$) represents the reduced sets. The Pre-PMVS columns show the images input to the sparse 3D reconstruction algorithm, PMVS shows the number of images used by the dense multi-view stereo algorithm, while model quality score is the number of features visible in the model (where higher scores are better). Test ID's (TID's) marked with '*' denote tests where reduction was performed without the sensor-based method.

Once the data was collected from the human subjects study, 3D models were generated from each of the 20 raw image sets using the Bundler and PMVS software, as described above, and then the quality of the resulting 3D models was evaluated.

To do this, several important features of the original scene were identified, and each 3D model was manually evaluated to determine which features had been faithfully constructed. The features were: 4 walls, 1 countertop, 1 door, 3 chairs, 1 window, 1 bookshelf, 1 white board, 1 armoire, 2 posters, 2 LCD monitors, 2 desks, and a Dell computer box.

First Bundler and PMVS were run on each of the 20 raw image sets, without performing the image filtering proposed above. The $X_n$ columns of Table 1 present these results. It is observed that the size of the reconstructed models varies across users, from over 800,000 3D points in the largest model to 0 points in the smallest model (which indicates that the 3D reconstruction failed to solve for any of the structure of the scene), with a mean of about 180,000 points. The subjective quality scores also varied significantly, from a score of 20 (indicating a perfect reconstruction according to the criteria) to 0 (again indicating that no useful model was generated), with a mean score of 6.2.

Moreover, 30% of the models scored higher than 10, indicating that a majority of the scene was successfully reconstructed. These results suggest that faithful 3D models of a space can often be generated from opportunistically captured images. This is a somewhat surprising result because most Structure from Motion approaches were designed for use with deliberately composed images. For example, some approaches assume that images have a low in-plane rotation twist angle (i.e. were taken such that the camera was level with respect to the ground). The images used in the above-described study were often of very low quality, with high twist angle, motion blur, poor focus, and random composition. The accuracy of the test models generated from these photographs demonstrates the ability of the feature detection and feature-key-matching algorithms to contribute to model generation despite the poor photography inherent to opportunistic image collection.

It was also investigated whether the anisotropic threshold reduction 304 and sensor based reduction 308 can reduce the size of the photo collections by filtering out low-quality images on the mobile device 102 itself in order to prevent having to store and transmit unnecessary images.

These techniques each require a threshold (the minimum quality score Tq and the maximum change in orientation direction $T_\Theta$), which intuitively trades off between the size of the image set and the quality of the resulting model. To estimate reasonable values for these thresholds, the model for one of the test subjects (#11, chosen because it had the largest number of images) was used, and the 730 (of 1,520) images that were not used by the 3D reconstruction algorithm (either because they were discarded as outliers or because they contained redundant information) were examined. It was found that most images with quality scores q less than 0.0012 were discarded by the PMVS process, so Tq was set to this value. Applying this threshold to image set #11 resulted in a 50% reduction in the number of images compared to the raw image set and eliminated 80% of the images that would have been discarded by 3D reconstruction. For the threshold on orientation angle changes, the threshold was conservatively set $T_\Theta=8°$ based on the fact that the 3D reconstruction algorithm recommends at most 15° separation between camera viewing directions. This process further reduced the image set for test #11 by 26.7%.

Having estimated these thresholds based only on one image set, the same two filtering techniques were applied with these same thresholds on all 20 datasets. Bundler and PMVS were then used on these reduced datasets. The X'n columns of Table 1 show the results. On average the filtering removes about 73% of images from the raw dataset, reducing the mean photo collection size from 864.05 to 232.5 across the 20 test subjects. The number of points in the resulting 3D models also decreases, from about 181,000 to 127,000, but the model quality scores remain almost the same (and actually very slightly increased by an average of 0.15 features). Thus, in spite of great reductions in the size of raw image datasets, the quality of the models was generally not compromised. This means that the application need only store and transmit about 27% of the images collected and still provide a user with the same degree of information about the environment.

The usefulness of the 3D model lies not only in the quality of the data housed therein, but in the ability of a user to accurately and readily perceive the data. To aid in the perceiving of the data, a visualization tool was created by adding the above-mentioned plug-in to MeshLab, an open-source tool for viewing 3D models. This tool allows the user to navigate the 3D point cloud model and to select particular points of interest. Meshlab then displays the raw images used to reconstruct that part of the scene.

The largest of the datasets (#11) was presented to two groups of human participants (none of whom who were familiar with the physical office that had been modeled). The first set of participants (N1=8) navigated the raw image set (1,520 images), without access to the model, by simply examining the images one-by-one. The second set of subjects (N2=10) had access to a 3D model generated from the reduced set of images (353 in all) using the method described above. Each group of participants was asked to perform two tasks, a coarse search for basic information about the space, and a fine search for specific sensitive details:

Coarse Search: In the Coarse Search phase, the participant was told to catalog the presence of unique objects or features from a defined list, using either the set of individual images or the single model. These features are listed in Table 2.

|  | walls | floor | ceiling | doors | windows | desks | tables | chairs | coarse eval score |
|---|---|---|---|---|---|---|---|---|---|
| number of features in space | 4 | 1 | 1 | 1 | 1 | 1 | 1 | 3 | 13 |
| raw image browsing $\mu_{n=8}$ | 3.75 | 2.50 | 1.50 | 3.75 | 1.25 | 2.13 | 1.13 | 5.00 | 0.75 |
| raw image browsing $\sigma_{n=8}$ | 2.82 | 1.31 | 0.93 | 1.67 | 1.04 | 1.64 | 0.99 | 2.62 | 5.95 |
| model navigation $\mu_{n=10}$ | 3.90 | 1.00 | 1.00 | 1.30 | 0.50 | 1.00 | 0.90 | 2.20 | 11.20 |
| model navigation $\sigma_{n=10}$ | 0.32 | 0.00 | 0.00 | 0.48 | 0.53 | 0.00 | 0.32 | 0.63 | 1.32 |

The objective of this phase was to assess the ability of participants to understand the context and global structure of the physical space. In this phase an objective score is assigned based on the ability of participants to catalog the features. The "coarse eval score" represents how closely the participants were able to identify the 13 features in the room, and was calculated as the sum of listed identifiable features (13) subtracted by the absolute values of individual errors. These errors can be due either to under-counting (e.g. claiming one wall when four are in the room) or over-counting (e.g. claiming nine walls when only four are in the room).

Fine Search: In the Fine Search phase, the participant was asked to act like a burglar looking for valuable information. The participant was given a list of items to look for, including financial documents, barcodes and QR codes, and other private information that had been planted in the original test space. One group of participants performed this search with solely the raw image set, while the other group of participants browsed the model and queried regions of interest for targeted images using the plug-in tool described above.

To motivate the participants to find as much information as possible, the participants were compensated by a cash payment that was commensurate with the number of objects they successfully identified. An objective score for this phase was assigned to each participant based on the ability to extract sensitive information from the image list that they provided.

Table 2 presents the results for the Coarse Search phase. The group using the 3D model scored 11.2 on average with a standard deviation of 1.32 features. The group using only the raw image set scored much lower, at about 0.75 (with standard deviation of 5.9). The difference in means between the two groups was statistically significant (p<0.002 according to Welch's t-test) and demonstrates that coarse feature identification and the aggregate relationship among an image set is greatly aided by use of a 3D model. An example of this is attempting to count the number of unique walls in the large collection of images; using the model it is obvious that the structure is a single room with four walls, but it is much more difficult if one must analyze over a thousand images individually (and subjects counted anywhere from 1 to 9 walls during this evaluation). Since many indoor walls are featureless surfaces, two different images of the same wall, under different lighting conditions, viewing angles, and positions, may be easily interpreted as images of two different walls without the context of a 3D model.

Table 3 presents the results for the Fine Search phase.

|  | checks | bar codes | documents | certificates | monitor | white board | desk surface | photo | fine eval score |
|---|---|---|---|---|---|---|---|---|---|
| number of features in space | 2 | 3 | 3 | 2 | 1 | 1 | 1 | 1 | 14 |
| raw image browsing $\mu_{n=8}$ | 0.80 | 0.95 | 1.20 | 0.85 | 0.50 | 0.40 | 0.10 | 0.40 | 5.20 |
| raw image browsing $\sigma^2_{n=8}$ | 0.67 | 0.72 | 0.67 | 0.34 | 0.47 | 0.52 | 0.32 | 0.52 | 1.21 |
| model navigation $\mu_{n=10}$ | 1.00 | 0.25 | 1.00 | 1.00 | 0.63 | 0.63 | 0.00 | 0.44 | 4.94 |
| model navigation $\sigma^2_{n=10}$ | 0.60 | 0.46 | 0.60 | 0.65 | 0.44 | 0.52 | 0.00 | 0.42 | 2.15 |

In this phase, the group using the model successfully identified 5.20 or 37.1% of the listed sensitive features on average, while the group using the raw image set found 4.94 or 35.3% of the sensitive features. Using the model and the greatly reduced image set, there is no observable loss in the ability to extract fine features using the application implementation as compared to the raw data that is available from a mobile camera. Nevertheless the model is of clear benefit for spatial awareness, and it will likely perform much better for supporting navigation and item identification in larger spaces or multiple rooms.

The software operations described herein can be implemented in hardware such as CPUs, GPUs, and/or discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executabcode when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, circuits, and structure described herein may also be produced as integrated circuits by such systems using the computer-readable medium with instructions stored therein. For example, an integrated circuit with the above-described software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of assembling a data set for the creation of a 3D model of an environment including:
    obtaining a plurality of images that have been passively and opportunistically captured by a mobile device;
    storing the plurality of images on the mobile device in mobile device storage;
    automatically electronically analyzing the stored images by the mobile device to assess at least one of quality, content, and redundancy;
    automatically deleting one or more images from the mobile device storage responsive to the automatic electronic analysis to create a retained subset of the obtained plurality of images; and
    constructing the 3D model of the environment in which the mobile device was located from the output retained subset of images, wherein the 3D model allows a user to select a portion of the model such that the selection causes presentation of a first set of images of the plurality of images obtained by the mobile device, the first set of images being selected from a set of images that were used to create the selected portion of the 3D model.

2. The method of claim 1, further including passively capturing the plurality of images at regular time intervals.

3. The method of claim 2, wherein the time interval is modified based on inputs from a motion detector within the mobile device.

4. The method of claim 1, further including capturing the plurality of images in a manner that is undetectable by a user of the mobile device.

5. The method of claim 1, further including outputting the retained subset from the mobile device.

6. The method of claim 1, wherein the automatic analysis of stored images includes a measurement of anisotropy of each image.

7. The method of claim 6, wherein images with anisotropy below a defined threshold are automatically deleted from the mobile device.

8. The method of claim 1, wherein images that have a similarity to other images stored on the mobile device above a threshold similarity value are automatically deleted from the mobile device.

9. The method of claim 1, further including obtaining orientation information for the mobile device and associating such orientation information with each of the obtained images.

10. A mobile device including:
a camera,
a memory; and
an image analyzer, the image analyzer operable to execute code that causes the image analyzer to:
opportunistically obtain a plurality of images captured by the camera and stored in the memory;
automatically electronically analyze the stored images to assess at least one of quality, content, and redundancy;
automatically delete one or more images from the mobile device storage responsive to the automatic electronic analysis to create a retained subset of the obtained plurality of images; and
constructing a 3D model of an environment in which the mobile device was located from the output retained subset of opportunistically obtained images, wherein the 3D model allows a user to select a portion of the model such that the selection causes presentation of a first set of images of the plurality of images obtained by the mobile device, the first set of images being selected from a set of images that were used to create the selected portion of the 3D model.

11. The mobile device of claim 10, further including at least one of a motion detector and an orientation detector.

12. The mobile device of claim 10, further including a transmitter/receiver operable to transmit images of the retained subset.

13. The mobile device of claim 10, further including an image collector, the collector operable to control the camera to obtain images, where such operation of the camera is done without a mobile device user being contemporaneously conscious that the camera is obtaining images.

14. The mobile device of claim 10, wherein the automatic analysis includes a measurement of anisotropy of each image and images with anisotropy below a defined threshold are automatically deleted from the mobile device.

15. A non-transitory computer readable medium having instructions thereon that when interpreted by a processor cause the processor to:
opportunistically obtain a plurality of images captured by a camera of a mobile device and stored in a memory of the mobile device;
automatically electronically analyze the stored images to assess at least one of quality, content, and redundancy;
automatically delete one or more images from the mobile device storage responsive to the automatic electronic analysis to create a retained subset of the obtained plurality of images; and
constructing a 3D model of an environment in which the mobile device was located from the output retained subset of opportunistically obtained images, wherein the 3D model allows a user to select a portion of the model such that the selection causes presentation of a first set of images of the plurality of images obtained by the mobile device, the first set of images being selected from a set of images that were used to create the selected portion of the 3D model.

16. The computer readable medium of claim 15, wherein the instructions further cause the processor to:
passively capture the plurality of images at regular time intervals.

17. The computer readable medium of claim 15, wherein the instructions further cause the processor to capture the plurality of images in a manner that is undetectable by a user of the mobile device.

18. The computer readable medium of claim 15, wherein the instructions further cause the processor to determine a measurement of anisotropy of each image such that images with anisotropy below a defined threshold are automatically deleted from the mobile device.

19. The method of claim 1, further comprising estimating a lag between a hardware capture timestamp and an image system creation timestamp for each image of the plurality of opportunistically captured images.

* * * * *